(No Model.)
C. HOFFMANN & E. RICHTER.
UTILIZING ELECTRIC MOTORS FOR OPERATING MACHINERY.
No. 513,507. Patented Jan. 30, 1894.
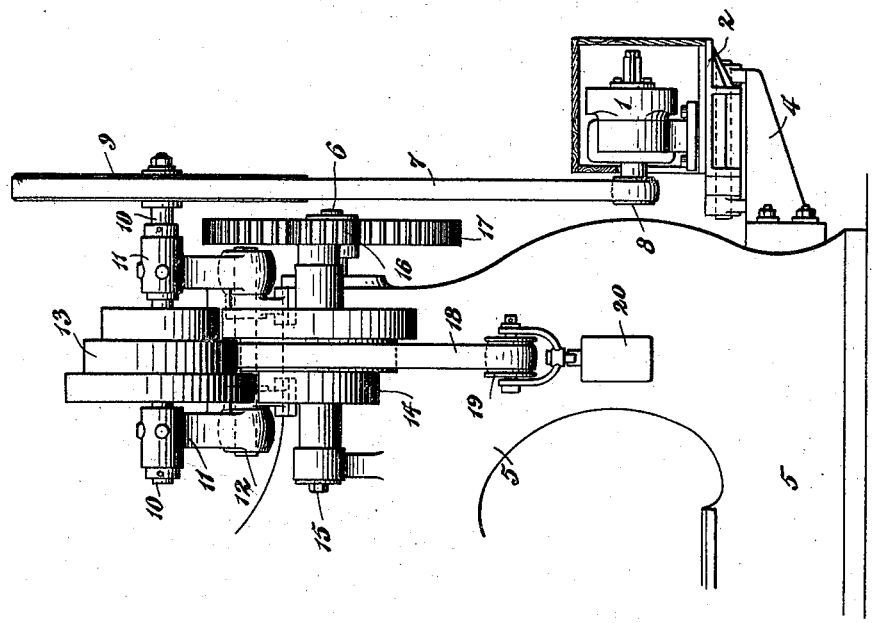
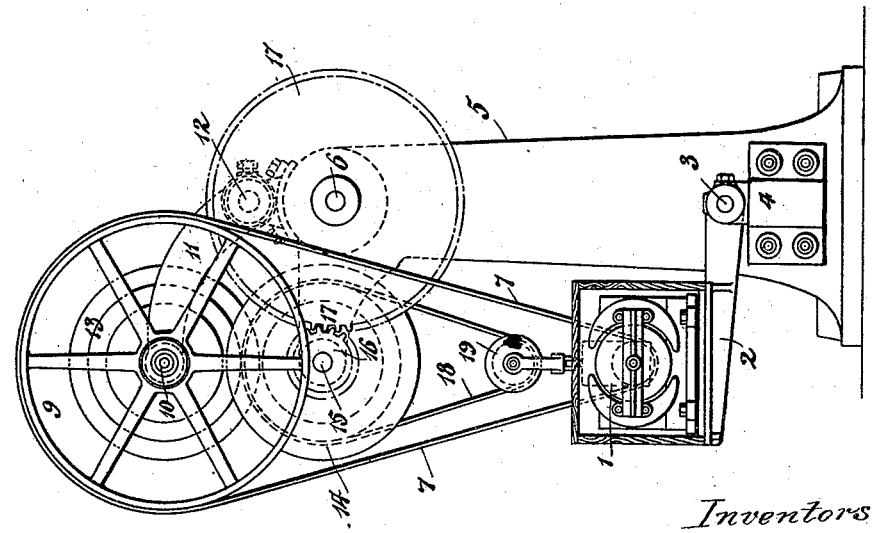
WITNESSES:
Timothy F Dillon
E. L. Brown.
Inventors
Carl Hoffmann
Ernst Richter
BY
ATTORNEY

UNITED STATES PATENT OFFICE.

CARL HOFFMANN AND ERNST RICHTER, OF BERLIN, GERMANY, ASSIGNORS TO SIEMENS & HALSKE, OF SAME PLACE.

UTILIZING ELECTRIC MOTORS FOR OPERATING MACHINERY.

SPECIFICATION forming part of Letters Patent No. 513,507, dated January 30, 1894.

Application filed April 11, 1893. Serial No. 469,914. (No model.) Patented in Germany February 9, 1893, No. 66,984.

*To all whom it may concern:*

Be it known that we, CARL HOFFMANN and ERNST RICHTER, subjects of the Emperor of Germany, residing at the city of Berlin, in the Empire of Germany, have invented new and useful Improvements in Utilizing Electric Motors for Operating Machinery, (for which we have obtained Letters Patent in Germany, No. 66,984, dated February 9, 1893,) of which the following is a specification.

The present invention is auxiliary to an invention shown in our prior patent, No. 496,567, granted to us May 2, 1893, which broadly embodies the fundamental features of construction and operation of an electric motor relatively to a machine or apparatus driven by it, and in a manner which most effectively transmits the power of the motor to the machine. In the aforesaid earlier specification the electric motor is described and shown as having a movable relation to the machine driven by it, whereby the weight or gravity of the motor is availed of in transmitting the power of the motor to the machine by means of flexible appliances which may be modified by bodily movement of the motor and with a result of imparting any desired speed to the machine being operated, without injuriously slackening the speed of the electric motor.

The invention herein described relates more particularly to a special arrangement of the gearing on the machine to be operated and to a special combination therewith and with the electric motor, of a frictionally operating belt or medium interposed in the power transmission gearing, and whereby the speed of the operative spindle or part of the machine may be changed without varying the speed of the motor, and simply by the shifting of the friction belt or means relatively to the driving pulleys off or on the machine.

In the accompanying drawings, forming a a part of this specification, similar numerals indicate like parts in both the figures.

Figure 1, is an end view of so much of a power machine necessary to illustrate our invention, the electric motor casing being shown in section; and Fig. 2, is a front view, or a view taken at right angles to Fig. 1.

The electric motor 1, which may have any ordinary or approved construction, is supported on a vertically movable bed-plate or platform 2, which at one end is pivoted at 3, to a bracket 4, which as shown is bolted to the main frame 5, of a power machine having a shaft or spindle 6, which is the operative part of the machine to be driven or rotated by or from the electric motor. The motor platform 2, may, however, be pivotally sustained in any manner which will allow a belt 7, leading from the motor pulley 8, to be passed over a power transmitting pulley 9, of the machine to be operated.

The pulley 9, is fastened on a shaft 10, which is journaled at the outer part of a gravitating frame 11, which as shown, is pivoted at 12, to suitable bearings or lugs on the machine frame 5, but said frame 11, may be otherwise pivoted if its pulley 9 bear the same relation with the motor pulley 8, and the belt 7, connecting these two pulleys, and provided also that a graduated cone pulley 13 fast on the shaft 10, shall have opposing relation to a corresponding cone pulley 14.

The pulley 14, is fast on a shaft 15, which is suitably journaled on the machine frame 5, and carries at one end a spur gear or pinion 16, which engages a larger spur gear 17, fixed to the working spindle or shaft 6, of the power machine. To promote clearer illustration, the gearing 16, 17, is shown partly in full lines and mainly in dotted lines in Fig. 1, of the drawings. The opposing cone pulleys 13, 14, each have three successively smaller belt receiving or actuating faces adapted to impart three different speeds to the machine shaft 6, but the cones may have more or less than three belt faces, if desired.

In order to obtain a variable speed of the machine spindle 6, from the electric motor power transmitting gearing through the cone pulleys 13, and 14, we place an endless belt 18 between said pulleys and in the lower bight of the belt may be placed a pulley 19, from the axle or shaft of which is suspended a weight 20. Obviously, the counterweighted belt may be placed between any opposing pair of the cone pulley faces and however the belt may be adjusted, the weighted pulley 19, will compel the belt to run or travel smoothly, or without buckling, between the cone pulleys.

The opposing cone pulley faces other than those in frictional contact with the belt 18, will of course be separated a distance equaling the thickness of the belt, and therefore cannot touch or affect each other.

The operation is very simple and effective. With the belt 18, adjusted at the center of the cone pulleys 13, 14, as shown in Fig. 2, of the drawings, an intermediate or medium speed of rotation will be given the work spindle or shaft 6, of the power machine; should the belt 18 be shifted to the right hand faces of the cone pulleys, the spindle 6 would rotate at a lower speed, and were the belt adjusted to the left hand pulley faces, the spindle would be driven at a higher speed. To shift the belt 18, it is only necessary for the attendant to lift or swing the upper cone pulley carrying frame 11, upward sufficiently to allow desired lateral transfer of the belt, it being understood that in thus lifting the frame 11, the electric motor 1, with its pivoted platform 2, will also be swung upward on the pivot 3, and the operative relations between the motor pulley 8, the frame pulley 9, and the driving belt 7, will not be changed in the least, and consequently the speed of the motor 1, will not be varied or affected during such readjustment of the counterweighted belt 18; nor will the speed of the motor be changed however the belt 18 may remain adjusted relatively with the pulleys 13, 14, to give any one of the three possible speeds to the work spindle or shaft 6, of the power machine.

It is not essential that the belt 18 have the counterweighted pulley 19, 20, to keep it taut, as said belt 18, when made shorter may be used without the counterweight, but we prefer to use the counterweighted pulley, substantially as shown in the drawings. The cone pulleys 13, 14, may also be substituted by single faced opposing pulleys to transmit the power of the electric motor to the machine by frictional contact of an interposed endless belt or other medium, and without varying the speed of the electric motor. We would here also mention the fact that in the construction shown in Figs. 1, 2, 3 and 6, of our prior application, Serial No. 451,242, the variation of speed of the operated machine depends on the degree of slackness or tension of a horizontally disposed belt leading from a pulley on a pivoted frame to a pulley on the operative spindle or part of the power machine, the belt tension being regulated by means of a treadle connected to the pivoted gearing-carrying frame of the power machine, and whereby the effective weight of the electric motor upon said frame gearing is modified and to such construction the specific claims of said patent were confined. In the present invention the treadle connection is dispensed with and the entire weight of the electric motor is constantly utilized to impart a variable speed to the power machine at the will of the operator, who simply shifts the frictional belt or power transmitting medium, located between opposing faces of the cone pulleys of the machine, to change the speed of the latter without varying the speed of the electric motor.

It is manifest that by means of the electric motor utilized as above described, a great variety of shop work may be done by operating somewhat distant or isolated iron, wood or textile fabric machinery by direct connection therewith of an electric motor to which the current carrying wires may easily be led any distance, whereby long lines of shaft and pulley gearing, expensive to put up and keep in running order, may be dispensed with and the room they occupy may be otherwise availed of. Furthermore, it is an advantage to be able to operate many machines without taking the necessary power by belts from overhead shafts, as the space overhead may be much more easily utilized for carrier apparatus, by which the work may be more conveniently brought to a machine or group of machines operated by directly connected electric motors, as will readily be understood.

Having thus described our invention, what we claim, and desire to secure by Letters Patent, is—

1. The combination, with a power machine having adjacent relatively fixed and movable driving pulleys, of an electric motor suspended by a belt from a pulley on the shaft of the movable driving pulley, and a frictional power transmitting medium interposed directly between adjacent opposing faces of the fixed and movable driving pulleys, substantially as described.

2. The combination, with a power machine having adjacent relatively fixed and movable driving pulleys, of an electric motor suspended by a belt from a pulley on the shaft of the movable driving pulley, and an endless belt interposed directly between adjacent opposing faces of the fixed and movable driving pulleys, substantially as described.

3. The combination, with a power machine having adjacent relatively fixed and movable driving pulleys, of an electric motor suspended by a belt from a pulley on the shaft of the movable driving pulley, an endless belt interposed directly between adjacent opposing faces of the fixed and movable driving pulleys, and a counter-weighted pulley in the bight of said endless belt, substantially as described.

4. The combination, with a power machine having adjacent relatively fixed and movable cone or stepped driving pulleys, of an electric motor suspended by a belt from a pulley on the shaft of the movable cone driving pulley, and a frictional power transmitting medium interposed directly between the fixed and movable cone driving pulleys and adjustable to different faces thereof, substantially as described.

5. The combination, with a power machine having adjacent relatively fixed and movable cone or stepped driving pulleys, of an electric motor suspended by a belt from a pulley on the shaft of the movable cone driving pulley, and an endless belt interposed directly between the fixed and movable cone driving pulleys and adjustable to different faces thereof, substantially as described.

6. The combination, with a power machine having adjacent relatively fixed and movable cone or stepped driving pulleys, of an electric motor suspended by a belt from a pulley on the shaft of the movable cone driving pulley, an endless belt interposed directly between the fixed and movable cone driving pulleys and adjustable to different faces thereof, and a counter-weighted pulley in the bight of said endless belt, substantially as described.

7. The combination, with a power machine, of a pivoted platform 2, an electric motor on said platform and movable therewith, cone pulley and wheel gearing 14, 16, 17, actuating the working spindle or part of the power machine, a pivoted frame 11, carrying a pulley 9, and cone pulley 13, a belt 7 suspending the electric motor from the pulley 9, and a frictional driving belt interposed between the cone pulleys 13, 14, substantially as described for the purposes set forth.

In testimony whereof we affix our signatures in the presence of two witnesses.

CARL HOFFMANN.
ERNST RICHTER.

Witnesses:
MAX WAGNER,
MAX PIEPER.